US009145912B2

(12) United States Patent
Manahan

(10) Patent No.: US 9,145,912 B2
(45) Date of Patent: Sep. 29, 2015

(54) FASTENING DEVICES FOR EXPLOSION-PROOF ENCLOSURES

(71) Applicant: Joseph Michael Manahan, Manlius, NY (US)

(72) Inventor: Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 236 days.

(21) Appl. No.: 13/793,672

(22) Filed: Mar. 11, 2013

(65) Prior Publication Data

US 2013/0292956 A1    Nov. 7, 2013

Related U.S. Application Data

(60) Provisional application No. 61/640,827, filed on May 1, 2012.

(51) Int. Cl.
*B65D 45/32* (2006.01)
*F16B 39/28* (2006.01)
*E05C 19/00* (2006.01)
(Continued)

(52) U.S. Cl.
CPC ............... *F16B 39/28* (2013.01); *E05B 65/001* (2013.01); *E05B 65/006* (2013.01); *E05C 19/00* (2013.01); *E05C 19/001* (2013.01); *E05C 19/14* (2013.01); *F16B 2/10* (2013.01); *F16B 5/0635* (2013.01); *F16J 13/06* (2013.01); *F16B 5/0642* (2013.01); *Y10T 292/225* (2015.04)

(58) Field of Classification Search
CPC ........ B65D 45/24; B65D 45/00; B65D 45/34; E05B 65/006; E05B 65/001; E05B 15/0086; E05B 83/01

USPC ..................... 292/257, 256.5, 256.69, 256.75
See application file for complete search history.

(56) References Cited

U.S. PATENT DOCUMENTS 1,482,049 A    1/1924    Swanson
1,836,949 A    12/1931   Balough
(Continued)

FOREIGN PATENT DOCUMENTS

CN    102791168    11/2012
EP    0346290      12/1989
(Continued)

OTHER PUBLICATIONS

E. Kamaganova, Search and Written Opinion issued in International Application No. PCT/US2014/055237, completion date Nov. 27, 2014, 7 pages, Federal Institute of Industrial Property, Moscow, Russia.
(Continued)

*Primary Examiner* — Mark Williams
(74) *Attorney, Agent, or Firm* — King & Spalding LLP

(57) ABSTRACT

A system for fastening a cover to a body of an explosion-proof enclosure using a plurality of fastening devices. Each fastening device can include a first load distributing member disposed on a body flange of a body of the explosion-proof enclosure, and a second load distributing member disposed on a cover flange of a cover of the explosion-proof enclosure. A fastening device can also include a securing member having a top end disposed on the first load distributing member and a bottom end disposed on the second load distributing member. A fastening device can further include a cam rotatably coupled to and positioned atop the first load distributing member.

18 Claims, 10 Drawing Sheets

(51) Int. Cl.
*E05B 65/00* (2006.01)
*E05C 19/14* (2006.01)
*F16J 13/06* (2006.01)
*F16B 2/10* (2006.01)
*F16B 5/06* (2006.01)

(56) References Cited

U.S. PATENT DOCUMENTS

| | | | |
|---|---|---|---|
| 2,360,826 A | 10/1944 | Cherry | |
| 3,360,155 A | * 12/1967 | Colonna | 220/325 |
| 3,362,573 A | 1/1968 | Wales, Jr. | |
| 3,416,823 A | 12/1968 | Auer | |
| 3,514,009 A | * 5/1970 | Davis et al. | 220/324 |
| 3,901,122 A | 8/1975 | Novotny | |
| 3,910,155 A | 10/1975 | Wilson | |
| 3,974,933 A | 8/1976 | Toth et al. | |
| 4,059,199 A | 11/1977 | Quaney | |
| 4,139,118 A | 2/1979 | Parker | |
| 4,157,146 A | 6/1979 | Svenson | |
| 4,233,697 A | 11/1980 | Cornwall | |
| 4,656,793 A | 4/1987 | Fons | |
| 4,664,281 A | 5/1987 | Falk et al. | |
| 4,729,584 A | * 3/1988 | Beckerer, Jr. | 292/257 |
| 4,902,046 A | 2/1990 | Maloberti | |
| 5,004,129 A | 4/1991 | Loch et al. | |
| 5,322,178 A | 6/1994 | Foos | |
| 5,346,090 A | 9/1994 | Purohit et al. | |
| 5,399,052 A | 3/1995 | Volkmann et al. | |
| 5,657,892 A | 8/1997 | Bolli et al. | |
| 5,785,449 A | 7/1998 | DiBene | |
| 5,888,140 A | 3/1999 | Klingler et al. | |
| 6,769,850 B2 | 8/2004 | Lay | |
| 6,938,385 B2 | 9/2005 | Lind | |
| 6,979,777 B2 | 12/2005 | Marcou et al. | |
| 7,877,948 B2 | 2/2011 | Davies | |
| 2011/0131898 A1 | 6/2011 | Nies et al. | |
| 2012/0160052 A1 | 6/2012 | Manahan et al. | |

FOREIGN PATENT DOCUMENTS

| | | |
|---|---|---|
| EP | 1970604 | 9/2008 |
| JP | 08026314 | 1/1996 |
| JP | 08-233108 | 9/1996 |
| JP | 0932923 | 2/1997 |
| JP | 10-101108 | 4/1998 |
| JP | 2008105746 | 5/2008 |
| JP | 4847646 | 10/2011 |
| WO | 2011084152 | 7/2011 |

OTHER PUBLICATIONS

E. Kamaganova, Search and Written Opinion issued in International Application No. PCT/US2014/055234, completion date Nov. 27, 2014, 6 pages, Federal Institute of Industrial Property, Moscow, Russia.

* cited by examiner

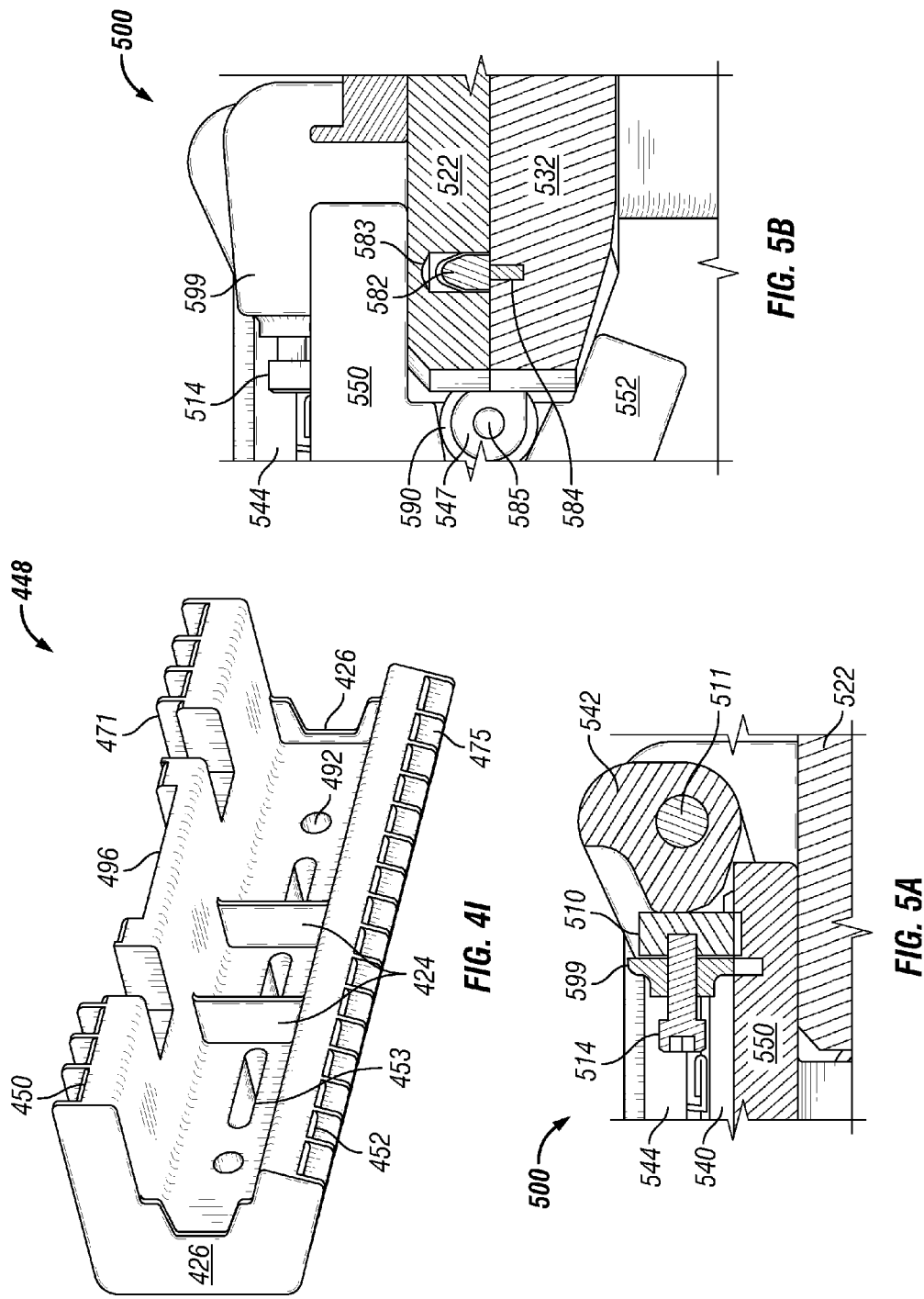

FASTENING DEVICES FOR EXPLOSION-PROOF ENCLOSURES

CROSS-REFERENCE OF RELATED APPLICATIONS

This application claims priority under 35 U.S.C. §119 to U.S. Provisional Patent Application Ser. No. 61/640,827, titled "Fastening Devices for Explosion-Proof Enclosures" and filed on May 1, 2012, the entire contents of which are hereby incorporated herein by reference.

The present application is further related to U.S. patent application Ser. No. 13/793,774, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/794,402, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/794,433, titled "Cover Release Mechanisms for Enclosures," which is being filed concurrently with the U.S. Patent and Trademark Office, and whose entire contents are hereby incorporated herein by reference.

The present application is further related to World Intellectual Property Organization (WIPO) Patent Application Serial Number WO2011/084152, titled "Enclosure Clamps and Clamp Systems," filed on Jan. 5, 2010, and whose entire contents are hereby incorporated herein by reference.

TECHNICAL FIELD

The present disclosure relates generally to explosion-proof and/or flame-proof enclosures, and more particularly to systems, methods, and devices for securing a cover of an explosion-proof enclosure to a body of the explosion-proof enclosure.

BACKGROUND

Explosion-proof receptacle housings and enclosure systems are used in many different industrial applications. Such explosion-proof receptacle housing and enclosure systems may be used, for example, in military applications, onboard ships, assembly plants, power plants, oil refineries petrochemical plants, and other harsh environments. At times, the equipment located inside such explosion-proof receptacle housing and enclosure systems is used to control motors and other industrial equipment.

In order for an explosion-proof enclosure to meet certain standards and requirements, the cover of the enclosure must be sealed to the body of the enclosure within certain tolerances. Often, this requires a large number (30 or more) of bolts to be tightened. Consequently, securing all of the bolts at the appropriate torque is a very time-consuming process. In addition, removing all of the bolts to access one or more components inside the explosion-proof enclosure is a time-consuming process.

SUMMARY

In general, in one aspect, the disclosure relates to a system for fastening a cover to a body of an explosion-proof enclosure using as number of fastening devices. Each fastening device can include a first load distributing member disposed on a flange of the explosion-proof enclosure. Each fastening device can also include a second load distributing member disposed on an opposing flange of the explosion-proof enclosure. Each fastening device can further include a securing member having a top end disposed on the first load distributing member and a bottom end disposed on the second load distributing member. Each fastening device can also include a cam rotatably coupled to and positioned atop the first load distributing member.

In another aspect, the disclosure can generally relate to a system for fastening a cover to a body of an explosion-proof enclosure using a number of fastening devices. Each fastening device can include a bracket having a top side, a bottom side, and a hack side, where the top side is movably coupled to a first outside portion of a flange of the explosion-proof enclosure, where the bottom side is movably coupled to a second outside portion of an opposing flange of the explosion-proof enclosure, and where the back side has a first aperture. Each fastening device can also include a cam fixture disposed on an outer portion of the back side, where the cam fixture comprises a second aperture, a clearance slot, and a cam feature, where the second aperture aligns with the first aperture. Each fastening device can further include a fastening device having a proximal end, where the proximal end comprises a mating feature that fits within the clearance slot and is movably disposed within the cam feature.

In yet another aspect, the disclosure can generally relate to a system for fastening a cover to a body of an explosion-proof enclosure using a number of fastening devices. Each fastening device can include a first load distributing member disposed on a flange. Each fastening device can also include a second load distributing member disposed on an opposing flange. Each fastening device can further include a securing device hingedly coupled to the second load distributing member and removably coupled to the first load distributing member. Each fastening device can also include a cam rotatably coupled to the securing device and comprising varying radii.

In yet another aspect, the disclosure can generally relate to a system for fastening a cover to a body of an explosion-proof enclosure using a number of fastening devices. Each fastening device can include a bracket having comprising a top side, a bottom side, and a back side, where the top side is movably coupled to a first outside portion of a flange of the explosion-proof enclosure, and where the bottom side is movably coupled to a second outside portion of an opposing flange of the explosion-proof enclosure. Each fastening device can also include a fastener receiver positioned between the flange and the opposing flange and coupled to the opposing flange. Each fastening device can further include a first fastener positioned on a third outside portion of the back side and hingedly coupled to the fastener receiver, where the first fastener traverses an aperture in the bracket. Each fastening device can also include a securing device removably coupled to the back side. Each fastening device can further include a cam fixedly coupled to the top portion of the cover flange and hingedly coupled to the securing device. Each fastening device can also include a lever fixedly coupled to the cam.

These and other aspects, objects, features, and embodiments will be apparent from the following description and the appended claims.

BRIEF DESCRIPTION OF THE DRAWINGS

The drawings illustrate only example embodiments of fastening devices for explosion-proof enclosures and are therefore not to be considered limiting of its scope, as fastening devices for explosion-proof enclosures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 4A-4I show an explosion-proof enclosure with an alternative example fastening device in accordance with certain example embodiments.

FIGS. 5A and 5B show an explosion-proof enclosure with another example fastening device in accordance with certain example embodiments.

DETAILED DESCRIPTION OF EXAMPLE EMBODIMENTS

Figure 1:
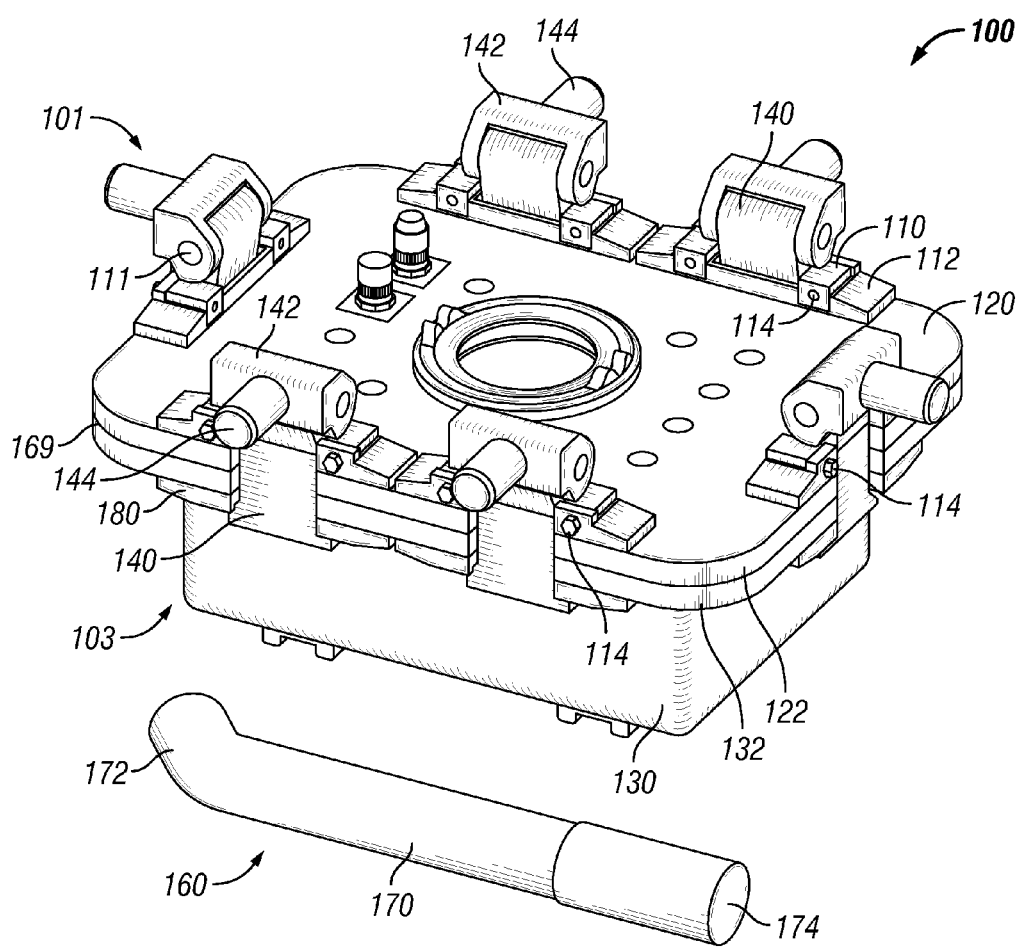
FIG. 1 shows a perspective view of an explosion-proof enclosure with example fastening devices in accordance with certain example embodiments.

The example embodiments discussed herein are directed to systems, apparatuses, and methods of fastening a cover of an explosion-proof enclosure to a body of the explosion-proof enclosure. While the example embodiments discussed herein are with reference to explosion-proof enclosures, other types of non-explosion-proof enclosures (e.g., junction boxes, control panels, lighting panels, motor control centers, switchgear cabinets, relay cabinets) or any other type of enclosure (e.g., a flame-proof enclosure) may be used in conjunction with example embodiments of fastening devices.

In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface including but not limited to a flat surface, a threaded surface, and a serrated surface.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' laboratories. Inc. (UL) (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Some standards also require that one or more tools are used to open an explosion-proof enclosure. Example embodiments described herein require the use of a tool, whether custom-made or standard, to disengage the fastening device and open the explosion-proof enclosure. Each of the components of the example fastening devices (e.g., fastener, fastener receiver, load distributing member, handle, cam, pin) can be made from one or more of a number of suitable materials, including but not limited to stainless steel, plastic, aluminum, ceramic, rubber, and iron.

Example embodiments of fastening devices for explosion-proof enclosures will be described more fully hereinafter with reference to the accompanying drawings, in which example embodiments of fastening devices for explosion-proof enclosures are shown. Fastening devices for explosion-proof enclosures may, however, be embodied in many different forms and should not be construed as limited to the example embodiments set forth herein. Rather, these example embodiments are provided so that this disclosure will be thorough and complete, and will fully convey the scope of fastening devices for explosion-proof enclosures to those or ordinary skill in the art. Like, but not necessarily the same, elements (also sometimes called components) in the various figures are denoted by like reference numerals for consistency.

FIG. 1 shows a profile view of a system 100 that includes an explosion-proof enclosure 103 using example fastening devices 101 in accordance with certain example embodiments. These and other components of the system 100 of FIG. 1 are described below. In one or more embodiments, one or more of the components shown in FIG. 1 may be omitted, added, repeated, and/or substituted. Accordingly, embodiments of a system that includes an explosion-proof enclosure should not be considered limited to the specific arrangements of components shown in FIG. 1.

Referring to FIG. 1, the explosion-proof enclosure 103 includes an enclosure cover 120 and a cover flange 122 around the perimeter of the enclosure cover 120. The cover flange 122 is mated to a body flange 132 that is positioned around the perimeter of the enclosure body 130. While one or more hinges may be positioned along one side of the enclosure cover 120 and a corresponding side of the enclosure body 130, in this example, there are no hinges. As a result, the enclosure cover 120 is separated from the enclosure body 130 when the enclosure cover 120 is not fastened to the enclosure body 130.

As shown in FIG. 1, a total of six example fastening devices 101 can be arranged around the perimeter of the cover flange 122 and the body flange 132. In certain example embodiments, additional example fastening devices 101 or fewer fastening devices 101 can be disposed along the perimeter of the cover flange 122 and the body flange 132, depending on one or more of a number of factors. Such factors can include, but are not limited to, the size (e.g., length, width) of the explosion-proof enclosure 103, the size of one or more features of the fastening device 101, the location and/or size of conduit feeding, into the body 130, and the location of features and/or devices on the top surface of the cover 120. The air gap that forms between the surfaces of the cover flange 122 and the body flange 132 when the cover flange 122 and the body flange 132 converge is the flame path 169. One of the functions of the fastening devices 101 is to ensure that the flame path 169 is within an accepted tolerance in light of a particular standard for the explosion-proof enclosure 103.

Each fastening device 101 includes a load distributing member 112 that is mechanically coupled to the top surface of the cover flange 122 and a load distributing member 180 that is mechanically coupled to the bottom surface of the base flange 132. In certain example embodiments, each load distributing member distributes the force applied to the top center portion of the load distributing member toward the sides of the load distributing member to apply a substantially even distribution of the force along the length of the load distributing member. Each load distributing member has a shape (e.g., length, width, pitch, height) that allows for a substantially even distribution of force along the length of the load distributing member when the force is applied to the top center portion of the load distributing member. The load distributing members can be mechanically coupled to the cover flange 122 and the base flange 132, as appropriate, using one or more of a number of coupling methods. Such coupling methods can include, but are not limited to, epoxy, fastening devices, compressive fittings, and slotted fittings.

In addition, in certain example embodiments, the example fastening device 101 includes a securing member 140. The securing member 140 has a length that can be greater than the sum of the height of the load distributing member 112, the height of the cover flange 122, the height of the base flange 132, and the height of the load distributing member 180. The bottom portion of the securing member 140 can mechanically couple to the top side (e.g., the top center portion) of the load distributing member 180. With respect to the top side of the load distributing member 180, the bottom portion of the securing member 140 can be fixedly coupled, rotatably coupled, removably coupled, coupled in some other manner, or any suitable combination thereof.

In certain example embodiments, the top portion of the securing member 140 is shaped to couple to the top side (e.g., the top center portion) of the load distributing member 112. The top portion of the securing member 140 can also couple to the cam 142. The cam 142 is rotatably coupled (using, for example, a pin 111) to the top portion of the securing member 140 so that the cam 142 can rotate, as described below.

One or more areas of the top portion of the load distributing member 112 can be coupled to a bottom portion of an optional wear plate 110. In certain example embodiments, the optional wear plate 110 is used to provide a surface on which the cam 142 rotates to apply a force to the securing member 140. Each wear plate 110 can be held in place by a fastener 114, which traverses at least a portion of the load distributing member 112 and can be adjusted by manipulating a protruding portion of the fastener 114 from a side of the load distributing member 112.

In certain example embodiments, the fastener 114 is used to adjust the load on the cam 142. For example, as shown in further detail in FIG. 2D, by screwing (or otherwise driving) the fastener 114 inward, the fastener 114 can apply increasing downward force on at least a portion of the wear plate 110, which in turn applies more force to close the distance between the abutting surfaces of the cover flange 122 and the base flange 132 (i.e., along the flame path). As another example, by screwing (or otherwise driving) the fastener 114 inward, the fastener 114 can draw the wear plate 110 up a ramp, which causes the wear plate 110 to put tension on the securing member 140.

As yet another example, by screwing (or otherwise extracting) the fastener 114, the fastener 114 can apply decreasing downward force on at least a portion of the wear plate 110, which in turn removes a portion of the force to close the distance between the abutting surfaces of the cover flange 122 and the base flange 132. In this way, the fastener 114 can be set (e.g., in the factory during manufacturing, in the field) in such a way as to ensure that the flame path at the surface where the cover flange 122 and the base flange 132 abut meet the appropriate standards for an explosion-proof enclosure. Examples of the fastener 114 include, but are not limited to a screw and a bolt.

In certain example embodiments, the optional wear plate 110 is serviceable and/or replaceable. For example, if the explosion-proof enclosure 103 cannot meet the standards required of an explosion-proof enclosure with the existing wear plate 110, the wear plate 110 can be replaced with a more suitable (e.g., thicker, harder) wear plate to allow the explosion-proof enclosure 103 to comply with the appropriate standards. The wear plate 110 can be removed in one or more of a number of ways, including but not limited to completely removing the fastener 114 and prying off the wear plate 110. The wear plate 110 can be made from one or more of a number of materials, including but not limited to brass, aluminum, rubber, stainless steel, plastic, and ceramic. In certain example embodiments, the wear plate 110 is a sacrificial material (is subject to wear) to help preserve the other components of the fastening device 101 that the wear plate 110 contacts.

Each cam 142 shown in FIG. 1 can be shaped to rotate about the top portion of the securing member 140 and apply an increasing force to the wear plate 110 as the cam 142 moves toward a closed position and a decreasing force to the wear plate 110 as the cam 142 moves toward a fully open position. For example, the distance between the aperture through which the pin 111 traverses and the edge of the cam 142 may be greatest when the cam 142 is in the fully closed position (as shown in FIG. 1), and such distance between the aperture through which the pin 111 traverses and the edge of the cam 142 that contacts the wear plate 110 gradually decreases as the cam 142 is rotated to the fully open position.

In order to rotate the cam 142, a tool may be used. A tool can be any device and/or component that can be used to rotate the cam 142 in one or more directions. A tool can be a separate device and/or can be integrated with some portion of the fastening device 101. For example, the lever 160, which includes a handle 174, an arm 170, and a coupling end 172, can be used to rotate the cam 142 between the open and closed positions. In certain example embodiments, the cam 142 includes one or more features to allow the tool to be used. In this case, the cam 142 has a protrusion 144 that fits into the couple end 172 of the lever 160.

FIGS. 2A-2D show various views of a system 200 having an alternative fastening device 233 for the explosion-proof enclosure 103. In one or more embodiments, one or more of the components shown in FIGS. 2A-2D may be omitted, added, repeated, and/or substituted. Accordingly, embodiments of a system that includes an explosion-proof enclosure should not be considered limited to the specific arrangements of components shown in FIGS. 2A-2D.

Figure 2A:
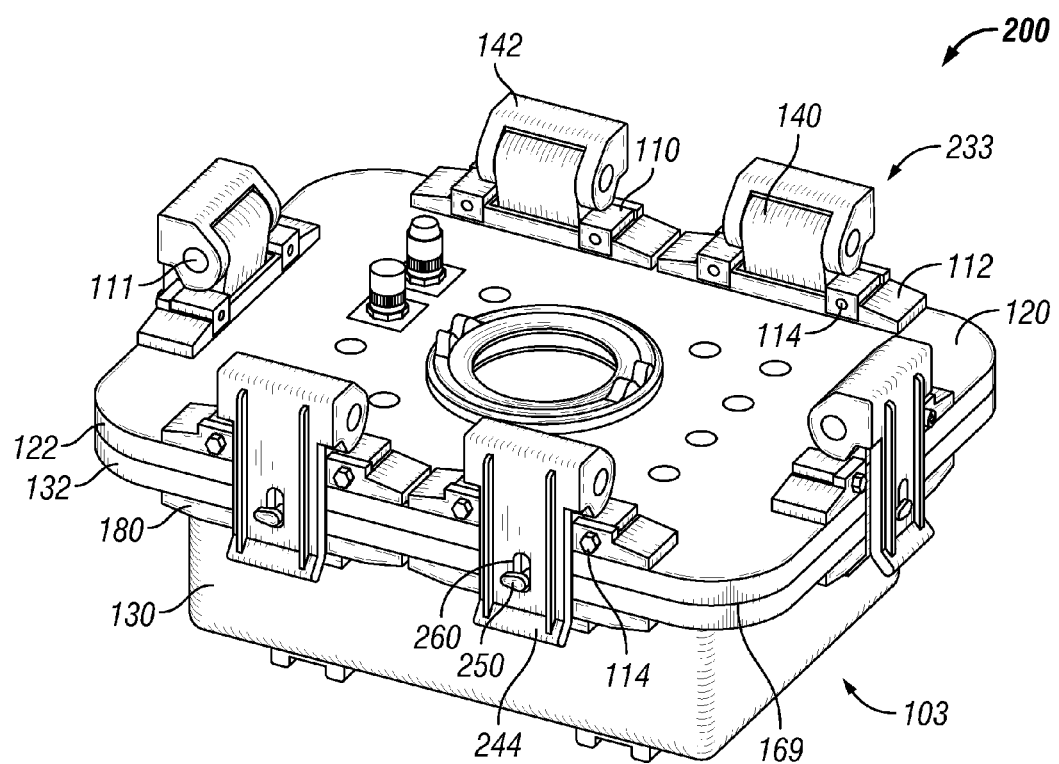
FIGS. 2A-2D show various views of an explosion-proof enclosure with alternative example fastening devices in accordance with certain example embodiments.
Figure 2B:
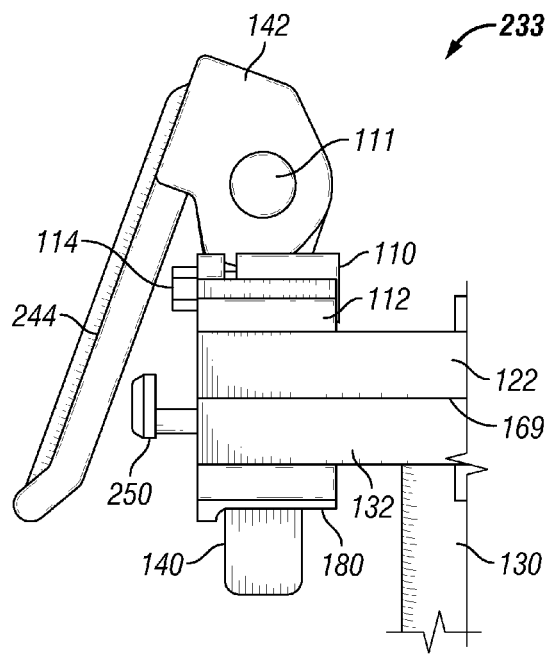
Figure 2D:
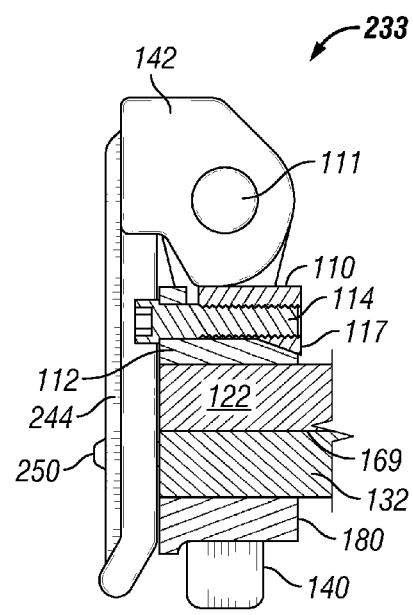

Referring to FIGS. 1-2D, the example fastening devices 233 shown in FIGS. 2A-2D are similar in function to the fastening devices 101 described above with respect to FIG. 1. Specifically, the cam 142, the securing member 140, the load distributing member 180, the load distributing member 112, the optional wear plate 110, the fastener 114, and the pin 111 are substantially similar to the corresponding components of the fastening device 101 of FIG. 1.

Figure 2C:
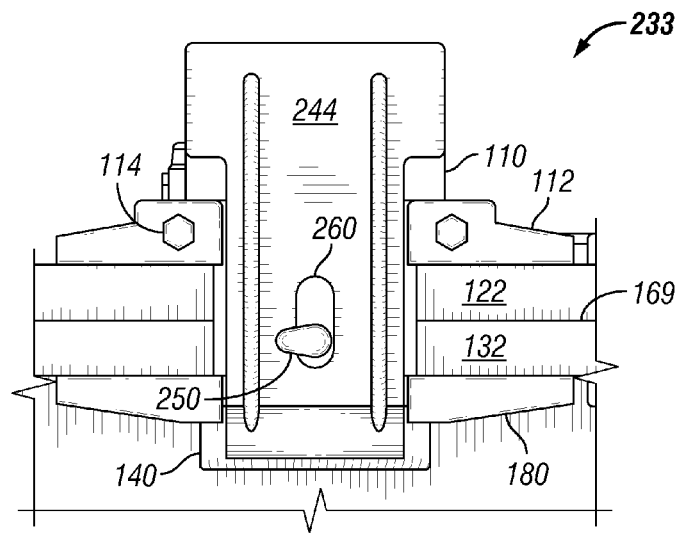

In this case, however, rather than using a tool coupled to a protrusion of the cam 142, a handle 244 is used to produce the leverage to rotate the cam 142 about the pin 111 that traverses the cam 142 and the top portion of the securing device 140. In certain example embodiments, the handle 244 includes an aperture 260 (generally called a retaining receiver) that is positioned in such a way as to receive a latch 230 (generally called a retaining member) when the handle 244 is in the fully closed position. The latch 230 can be rotated around an axis so that, in certain positions, the latch 230 prevents the handle 244 from moving away from the fully closed position, as shown in FIG. 2C. The latch 230 can include a return, spring (not shown) that rotates the latch approximately 90° when the handle 244 is in the fully closed position.

In certain example embodiments, a tool is used to rotate the latch 230 and/or pry the handle 244 away from the fully closed position. Alternatively, the latch 230 can be rotated and/or the handle 244 can be pried away from the full closed position by hand. FIG. 2D shows a cross-sectional side view of a wedge 117, positioned on the underside of the wear plate 110 and adjacent to the top portion of the load distributing member 112, that can be moved upward or downward (thus applying less or more pressure on the top portion of the load adjusting member 112) by moving the fastener 114 out of the load distributing member 112 or further into the load distributing member 112. This concept can similarly apply to the example fastening device 101 of FIG. 1.

Figure 3A:
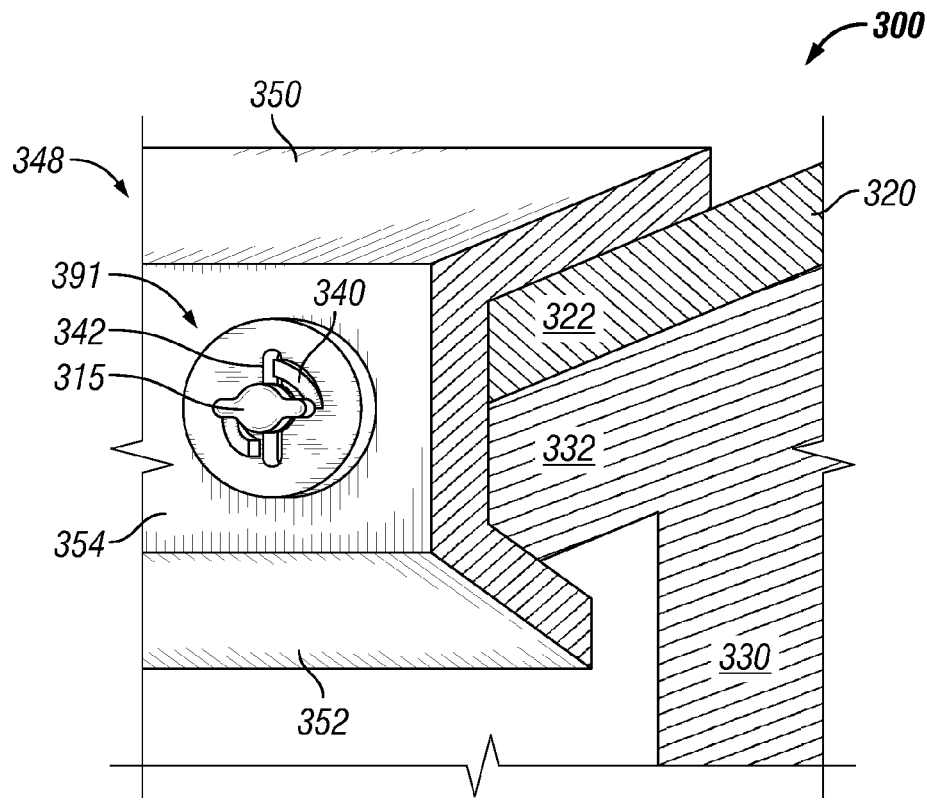
FIGS. 3A and 3B show various views of example fastening devices in accordance with certain example embodiments.
Figure 3B:
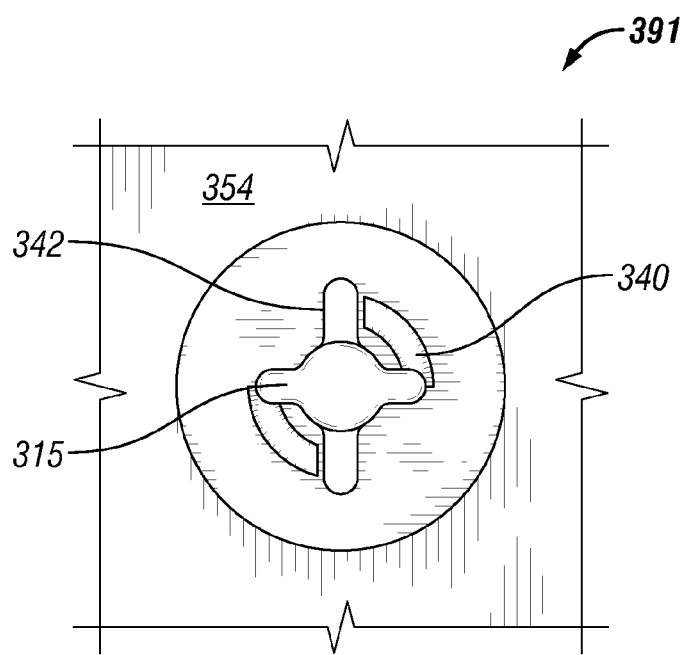

FIGS. 3A and 3B show an application of using, a fastening device 390 to secure a bracket 348 around the top surface of the cover flange 322 and the body flange 332 of an explosion-proof enclosure 300. The bracket 348 is shown in FIG. 3A as a U-shaped bracket, but the bracket 348 can also have one or more of a number of other shapes. The bottom side 352 of the bracket 348 is antiparallel to the top side 350, where the top side 350 is substantially perpendicular to the back side 354 that joins the top side 350 and the bottom side 352. In certain example embodiments, the cover flange 322 and/or the body flange 332 is shaped to conform to the bracket 348. For example, in this case, the bottom portion of the body flange 332 includes a chamfer that is cut at a downward angle that is substantially parallel to the bottom side 352 of the bracket 348 when the bracket 348 is engaged with the explosion-proof enclosure 300.

In certain alternative example embodiments, the bottom side 352 is substantially perpendicular to the back side 354, and the top side 350 is antiparallel to the bottom side 352. In such a case, the top portion of the cover flange 322 includes a chamfer that is cut at an upward angle that is substantially parallel to the top side 350 of the bracket 348 when the bracket 348 is engaged with the explosion-proof enclosure 300.

The cover flange 322 and/or the body flange 332 can also be altered (e.g., machined) to include a fastener receiver (not shown, but discussed below with respect to FIGS. 4E and 4F), either as an integrated piece or to secure a separate fastener receiver. In certain example embodiments, as shown in FIG. 3A, such a fastener receiver receives a threaded stem of the fastening device 391 when the fastening device 391 traverses an aperture in the back side 354 of the bracket 348.

In addition, or in the alternative, a cam fixture 391 can be disposed within an aperture in the back side 354 of the bracket 348. The cam fixture 391 can be part of a single piece with the bracket 348 (as from a mold). Alternatively, the cam fixture 391 can be a separate piece that is mechanically coupled to the bracket 348. In such a case, the example cam fixture 391 can be be mechanically coupled to the aperture in the back side 354 of the bracket 348 in one or more of a number of ways, including but not limited to threadably, slidably, and fixedly.

The cam fixture 391 can include a clearance slot 342, a cam feature 340, and an aperture (hidden from view by the proximal end 315 of a fastening device). The clearance slot 342 can receive the proximal end 315 of the fastening device when the fastening device has been inserted into the aperture of the cam fixture 391. The aperture of the cam fixture 391 can align with and have substantially the same size and shape as an aperture that traverses the back side 354 of the bracket 348.

The shape and size of the clearance slot 342 relative to the proximal end 315 allow only a limited number of orientations for the proximal end 315 to fit within the clearance slot 342. Such an alignment can coincide with coupling features (e.g., quick release threads) disposed on the distal end of the fastening device, as well as the cover flange 322 and/or the body flange 332.

Once the proximal end 315 is fit within the clearance slot 342, the proximal end 315 (and, thus, the rest of the fastening device) can be rotated along the cam feature 340 (in this case, clockwise) until the proximal end 315 reaches the end of the cam feature 340 (in this case, approximately 90°). The slope and distance (e.g., amount of rotation) of the cam feature 340 can coincide with the slope and distance of the coupling features at the distal end of the fastening device.

When the proximal end 315 of the fastening device movably (e.g., rotatably) travels to the end of the cam feature 340, the fastening device is at an optimal tension. Such optimal tension of the fastening device can also, or in the alternative, be a result of the distal end of the fastening device movably (e.g., rotatably, threadably) coupling to a coupling feature disposed in the cover flange 322 and/or the body flange 332. In any case, as a result, the bracket 348 is forced toward (movably coupled to) the explosion-proof enclosure 300. When this occurs, the slanted angle formed between the back side 354 and the bottom side 352 of the bracket 348 applies a force to the angled portion (the chamfer) on the bottom surface of the body flange 332 to close the distance of the flame path 369.

In certain example embodiments, the distal end of the fastening device has quick release threads disposed thereon. Details about quick release threads can be found in U.S. patent application Ser. No. 13/793,774, titled "Fastening Devices for Explosion-Proof Enclosures," which is being filed concurrently with the U.S. Patent and Trademark Office and whose contents are hereby incorporated by reference. The term "quick release" is meant to generally define fasteners that can take less than one full turn of travel to reach optimal tension. Such threads on a quick release fastener can be called quick release threads. For example, the quick release fastener can travel 90° to reach the end of the mating thread to which the threads of the quick release fastener are threadably coupled. Alternatively, the quick release fastener can travel any other distance, including but not limited to approximately 45°, 180°, and 270°. In certain example embodiments, the quick release fastener can travel more than one turn (greater than 360°).

FIGS. 4A-4I show an example of a system 400 that includes an example fastening device 433 used to secure an explosion-proof enclosure 403 in accordance with certain example embodiments. In one or more embodiments, one or more of the components shown in FIGS. 4A-4I may be omitted, added, repeated, and/or substituted. Accordingly, embodiments of a fastening device should not be considered limited to the specific arrangements of components shown in FIGS. 4A-4I.

Referring now to FIGS. 1-4I, FIG. 4A shows a system 403 where the cover 420 and base 430 of the explosion-proof enclosure 403 are secured using the example fastening device 433. The fastening device 433 in this case uses a bracket 448 that is substantially similar to the bracket described above with respect to FIG. 3A. Specifically, the top side 450 of the bracket 448 contacts the top surface of the cover flange 422, and the bottom side 452 of the bracket 448 is antiparallel to the top side 450 and contacts a chamfered portion of the bottom surface of the base flange 432.

In this case, however, the bracket 448 is "boltless," meaning that such a fastener (e.g., bolt, screw) is not used to directly couple the cover flange 422 and the body flange 432. In addition, optionally, the top side 450, the back side 454, and the bottom side 452 each have an array of protrusions. For example, optional protrusions 471 can be disposed upon the top side 450, optional protrusions 473 can be disposed upon the back side 454, and optional protrusions 475 can be disposed upon the bottom side 452. The aforementioned protrusions can serve one or more of a number of purposes. For example, the protrusions can provide structural reinforcement and maintain mechanical integrity of the bracket 448.

Figure 4A:
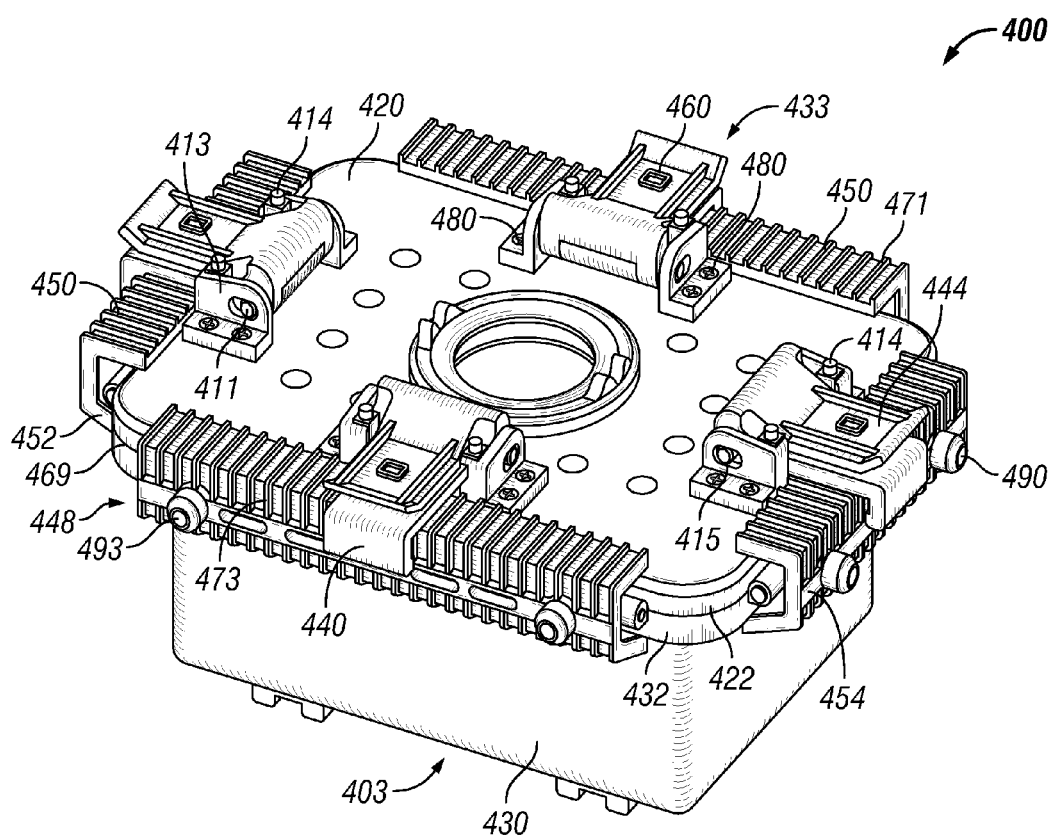

The protrusions, if any, can be aligned in one or more of any number of alignments, including but not limited to perpendicular to the cover flange 422, as shown in FIG. 4A. In addition, when there are multiple protrusions on a surface (e.g., the top side 450), each protrusion can be oriented in any manner relative to the other protrusions on the surface, including but not limited to in parallel, as shown in FIG. 4A. Each protrusion can be of any height and/or thickness. In addition, each protrusion can have varying heights and/or thicknesses along the length of the protrusion. The protrusions can form a single piece with the bracket 448, as in a forged manufacturing process. Alternatively, the protrusions can be separate members that are mechanically coupled to the bracket 448. In such a case, the protrusions can be mechanically coupled to the bracket 448 using one or more of a number of methods, including but not limited to welding, fastening devices, epoxy, and overlaying brackets, and slotted receivers.

In addition, certain elements of the fastening device 233 (or substantial portions thereof) described above with respect to FIGS. 2A-2D can be included with the fastening device 433. In this case, the orientation of the fastening device 433 of FIG. 4A is rotated by 90° so that the fastening device 433 applies a lateral force inward rather than vertical force. Further, a fastener 490 traverses the back side 454 of the bracket 448 to help provide leverage to draw the bracket 448 toward and/or away from the explosion-proof enclosure 403. The integration of these components is discussed below.

Figure 4B:
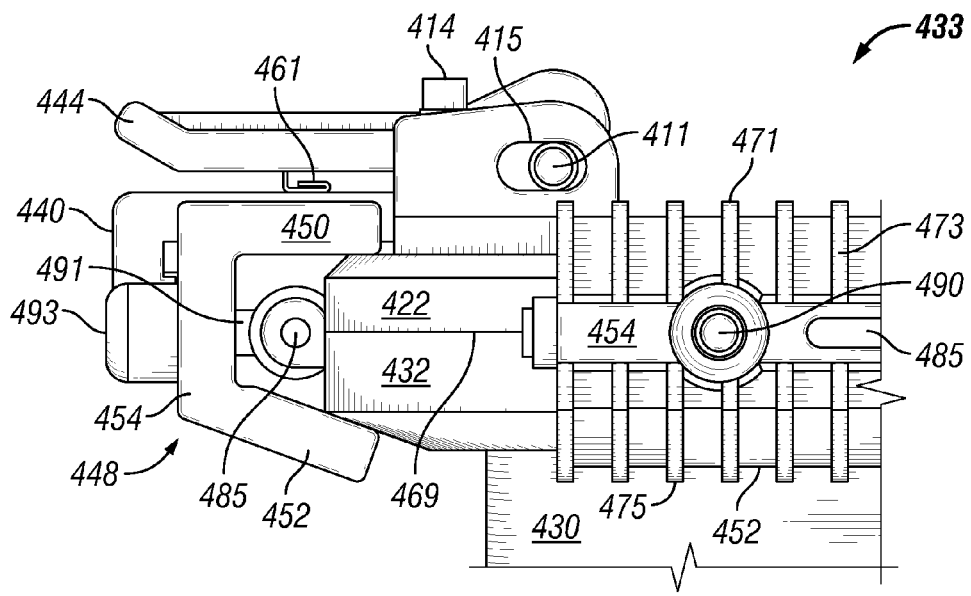
Figure 4C:
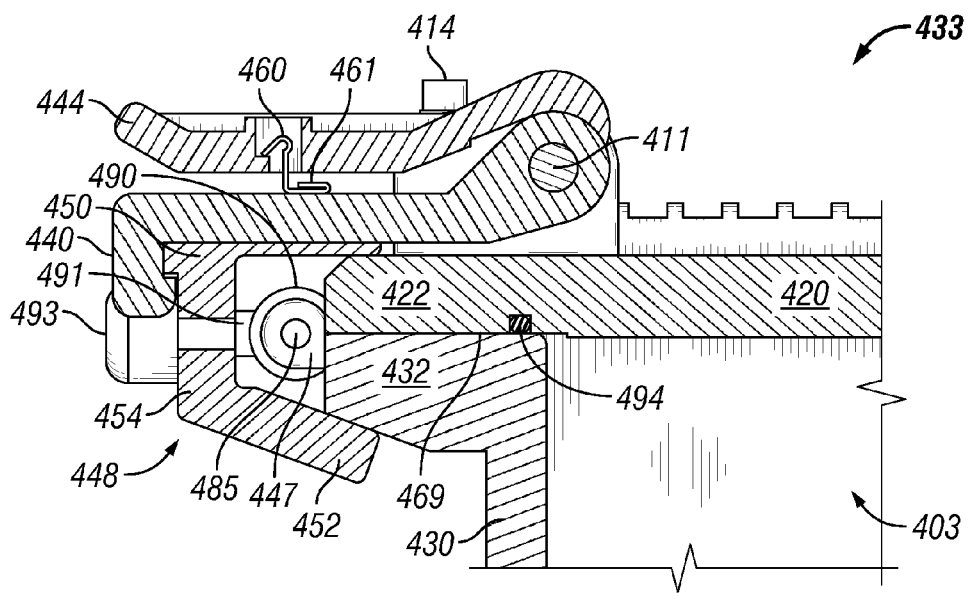
Figure 4D:
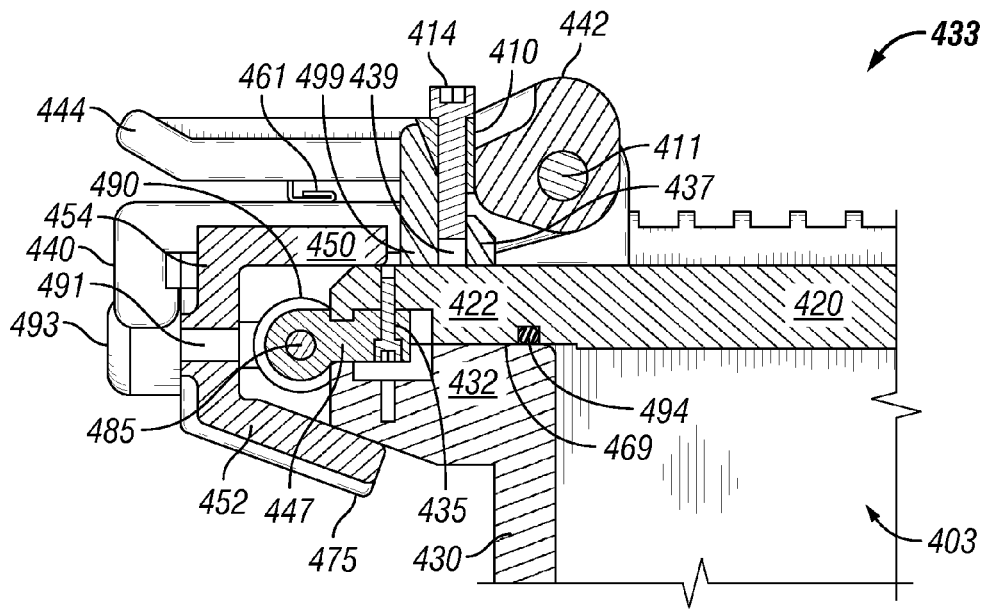

Reference will now be made with respect to FIGS. 4A-4D. FIG. 4B shows a side view of the fastening device 433. FIG. 4C shows a cross-sectional side view of the fastening device 433 taken along the middle of the handle 444. FIG. 4D shows a cross-sectional side view of the fastening device 433 taken along the wear plate fastener 414. In FIG. 4B, the cover 420 and base 430 of the explosion-proof enclosure 403 are coupled together, forming a flame path 169 where the cover flange 422 and the base flange 432 are joined. The bracket 448 is positioned so that the top side 450 begins to contact the top surface of the cover flange 422 and the bottom side 452 begins to contact the bottom surface of the base flange 432, a portion of which is a chamfer that is cut away to form a surface that is substantially parallel to the bottom side 452 of the bracket 448.

In certain example embodiments, the lever 444 is engaged by pushing the lever 444 downward, toward the bracket 448. As this occurs, the cam 442 (in FIG. 4D) is engaged, which draws the link 411 along the slot 415 of the lever base 499. The securing member 440, mechanically coupled to the link 411, can be drawn toward the explosion-proof enclosure 403 and engage the back side 454 of the bracket 448. When the bracket 448 is drawn toward the explosion-proof enclosure 403, the bottom side 458 of the bracket 448 can supply a compressive force to the base flange 432 against the cover flange 422 to reduce the flame path 169. In certain example embodiments, a gasket 494 is disposed within a channel (not shown) on the bottom surface of the cover flange 422 and/or the top surface of the base flange 432. In such a case, as the bracket 448 is drawn toward the explosion-proof enclosure 403, the gasket 494 is compressed, providing a seal against ingress while providing a flame path 169 that meets one or more applicable standards (e.g., flame path 169 no greater than 0.0015 inches).

In certain example embodiments, when the lever 444 reaches the fully-closed position, an engaging member 461 traverses an aperture 460 in the lever 444 and engages a portion of the lever 444 to secure the lever 444 in the fully-closed position. For example, as shown in FIG. 4C, the engaging member 461 can be a spring, clip that engages a slot in the aperture 460 of the lever 444 to secure the lever 444. The engaging member 461 provides tamper resistance and can require a tool (not shown) to release the lever 444. The tool can be a specially-designed tool or a standard tool (e.g., a screwdriver). Other examples of the engaging member 461 can include, but are not limited to, a screw and a bolt. Further, the engaging member 461 can be positioned in one or more of a number of different locations with respect to the lever 444.

In addition, or in the alternative, one or more other fastening mechanisms can be used to secure the bracket 448 of the fastening device 433 while the bracket 448 is engaged with the explosion-proof enclosure 403. For example, a spade protrusion with an aperture can be mechanically coupled to and protrude from one or both ends of the top side 450 and/or the bottom side 452 of the bracket 448. In such a case, spade protrusions with corresponding apertures can be mechanically coupled to and protrude from the cover 420, the cover flange 422, the body 430, and/or the body flange 432. The apertures of the spade protrusions can align, when the bracket 448 is properly coupled to the explosion-proof enclosure 403 when the fastening device 433 is engaged, to allow a fastening device to pass therethrough. Examples of such a fastening device can include, but are not limited to, a screw, a bolt, and a lockout device. The spade protrusions can have one or more of a number of shapes, including but not limited to a spade and a fork (having two or more prongs).

FIG. 4D shows how the compressive force applied by the bracket 448 can be adjusted. The fastener 414 can be driven into and/or extracted from an aperture 439 along the edge of the lever base 499. As shown in FIG. 4D, the lever base 499 can have a slope, as with segment 437 of the lever base 499. As the fastener 414 is driven into the aperture 439, a force can be applied to the wear plate 410 that allows the wear plate 410 to traverse the slope of the lever base 499. In the absence of a wear plate 410, the fastener 414 can traverse the slope of the lever base 499. The wear plate 410 (or the fastener 414) can then apply the resultant force required to the link 411 and, eventually, the bracket 448. Such adjustments to the fastener 414 can be made during manufacturing and/or in the field. By movably (e.g., threadably) coupling the fastener 414 to the wear plate 410, the wear plate 410 (or the fastener 414) can apply the proper load to the cam 442, and thus the fastening device 433.

If too much clamping force is applied to the cam 442, the flame path 169 will be too small, which could increase the pressure developed in an explosion inside the explosion-proof enclosure 403 that exceeds the strength of the explosion-proof enclosure 403. If the too little clamping force is applied to the cam 442, the flame path 169 can be too large, which could let the flame escape from the explosion-proof enclosure 403. In either case, the standards required for an explosion-proof 403 may not be met.

In addition, in certain example embodiments, the fastening device 433 includes one or more hinges that provide a hinged coupling between the cover 420 and the base 430 of the explosion-proof enclosure 403. In such a case, a fastener 491 traverses the back side 454 of the bracket 448 and has an eye bolt-type of configuration at its distal end 490. Coupled to the distal end 490 of the fastener 491 is one or more optional hinging fasteners 447 (also called anchors). Each hinging fastener has a proximal end that mechanically couples to the distal end 490 of the fastener 491 and a distal end that is mechanically coupled to a lower surface of the cover flange 422 and/or an upper surface of the base flange 432.

The distal end of the hinging fastener 447 can be fixedly and/or removably coupled to the lower surface of the cover flange 422 and/or an upper surface of the base flange 432 in one or more of a number of ways. For example, as shown in FIG. 4D, a fastener 435 can be used to mechanically couple the hinging fastener 447 to the cover flange 422 by traversing an aperture in the base of the hinging fastener 447 and a keyway (hidden from view by the fastener 435) in the cover flange 422. As another example, the fastener 435 can be used to mechanically couple the hinging fastener 447 to the base flange 432 by traversing the aperture in the base of the hinging fastener 447 and a keyway 437 in the base flange 432.

In certain example embodiments, the keyway 437 traverses only a portion of the cover flange 422 and/or the base flange 432. The fastener 435 can have one or more features that allow for removable coupling (e.g., mating threads) or fixed coupling (e.g., riveting, epoxy). If one hinging fastener 447 is mechanically coupled to the body flange 432 and another hinging fastener 447 is mechanically coupled to the cover flange 422, then a hinge for the enclosure 403 can be created. By contrast, if both hinging fasteners 447 are attached to the cover flange 422 or the body flange 432, then the bracket 448 is able to pivot out of the way and allow the cover 420 to separate from the body 430 to open the enclosure 403.

In addition, or in the alternative, the hinging fastener 447 can be mechanically coupled to the lower surface of the cover flange 422 and/or an upper surface of the base flange 432 using one or more other fastening methods, including but not limited to welding, integrated construction of the cover flange 422 and/or body flange 432, and compression fittings.

In certain example embodiments, the coupling between the distal end 490 of the fastener 491 and the proximal end of the one or more hinging fasteners 447 is a rotatable coupling. For example, as shown in FIG. 4D, the distal end 490 of the fastener 491 and the proximal end of the hinging fasteners 447 can be coupled by a pin 485 that allows the fastener 491 to rotate about the hinging fasteners 447. As a result, a hinge can be created, using the bracket 448, between the cover 420, the body 430, and/or the cover 420 and the body 430 of the explosion-proof enclosure 403. Regardless of how the hinging fasteners 447 are coupled to the cover flange 422 and/or the base flange 432, the hinge can be protected from destructive elements and/or threes to which the explosion-proof enclosure 403 is exposed because the hinge is located inside the bracket 448.

Figure 4E:
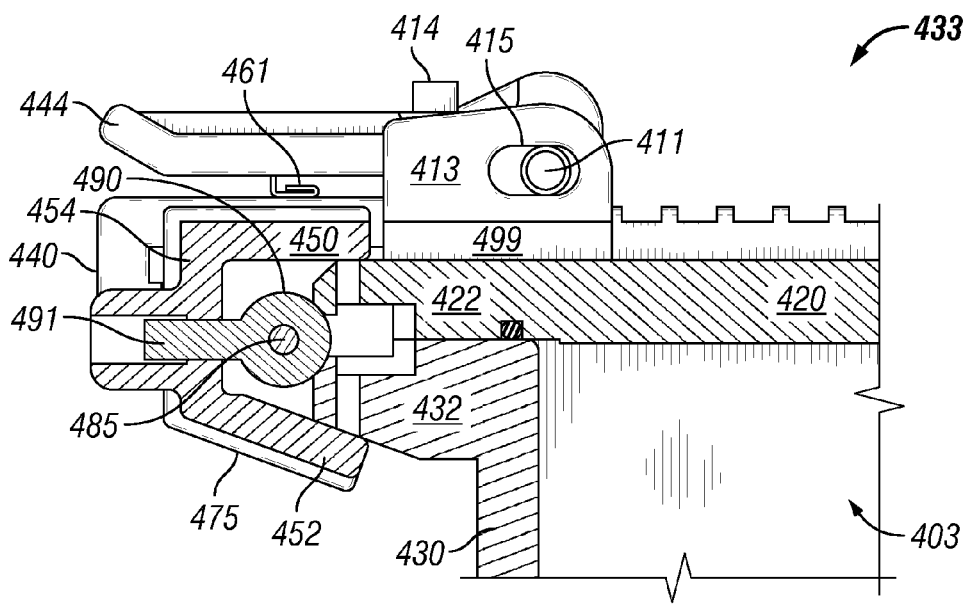

FIG. 4E shows an example of how to open the example fastening device 433 to open the explosion-proof enclosure 403. First, the engaging member 461 is released from the aperture 460 within the lever 444. Releasing the engaging member 461 may be performed using a tool. Then, the lever 444 is lifted upward and toward the explosion-proof enclosure 403. As the lever 444 moves away from the fully closed position to the open position, the link 411 is pushed to the left in the slot 415 of the lever support 480. The amount that the link 411 is pushed to the left is limited by the slot 415 in the lever base 499.

The securing member 440, mechanically coupled to the link 411, can be pushed away from the explosion-proof enclosure 403 and disengage the back side 454 of the bracket 448. When the bracket 448 is pushed away from the explosion-proof enclosure 403, the compressive force supplied by the bottom side 458 of the bracket 448 to the base flange 432 can be reduced or eliminated. In such a case, as the bracket 448 is pushed away from the explosion-proof enclosure 403, the gasket 494 is decompressed, removing the seal against ingress and widening and/or eliminating the flame path 169.

To use one or more hinges between the cover 420 and the base 430, the bracket 448 can then be manually pushed (as by a user) further away from the explosion-proof enclosure 403 along the fastener 491. The movement of the bracket 448 away from the explosion-proof enclosure 403 along the fastener 491 can be limited, as by the fastener head 493 shown, for example, in FIG. 4D. When the bracket 448 has moved far enough away from the explosion-proof enclosure to clear the cover 420 and the base 430, the bracket 448 can be rotated downward (toward the base 430) using the rotatable coupling between the distal end 490 of the fastener 491 and the proximal end of the hinging fastener 447. In certain example embodiments, the bracket 448 can be rotated upward, toward the cover 420.

Figure 4F:
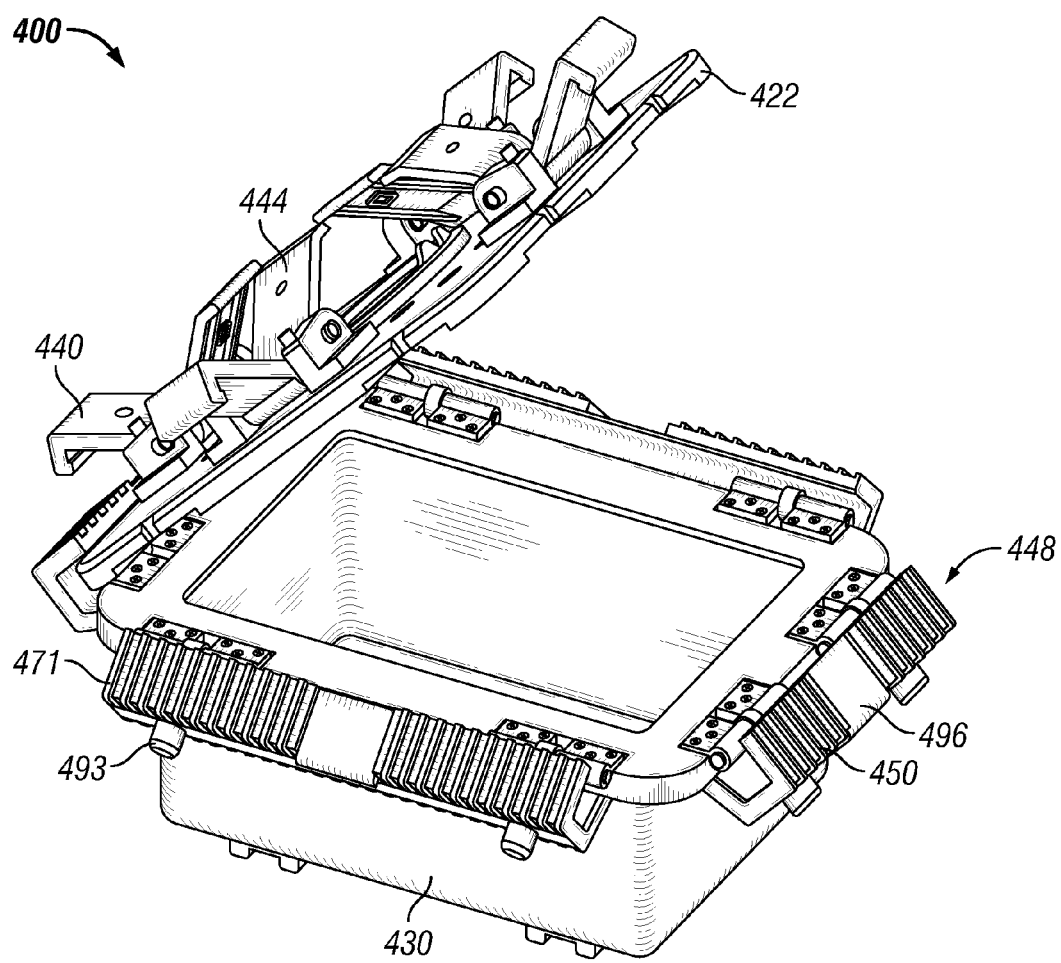

FIG. 4F shows all of the fastening devices 433 fully disengaged from the explosion-proof enclosure 403, with the left sides of the cover 420 and the body 430 joined by a hinge. In certain example embodiments, the brackets 448 (through the hinging fasteners 447) are fixedly coupled to the cover 420 or the body 430. The hinging fastener 447 can be reoriented by being fixedly coupled to the other enclosure component (cover 420 to body 430 or body 430 to cover 420) or to both the body 473 and the cover 420.

Figure 4G:
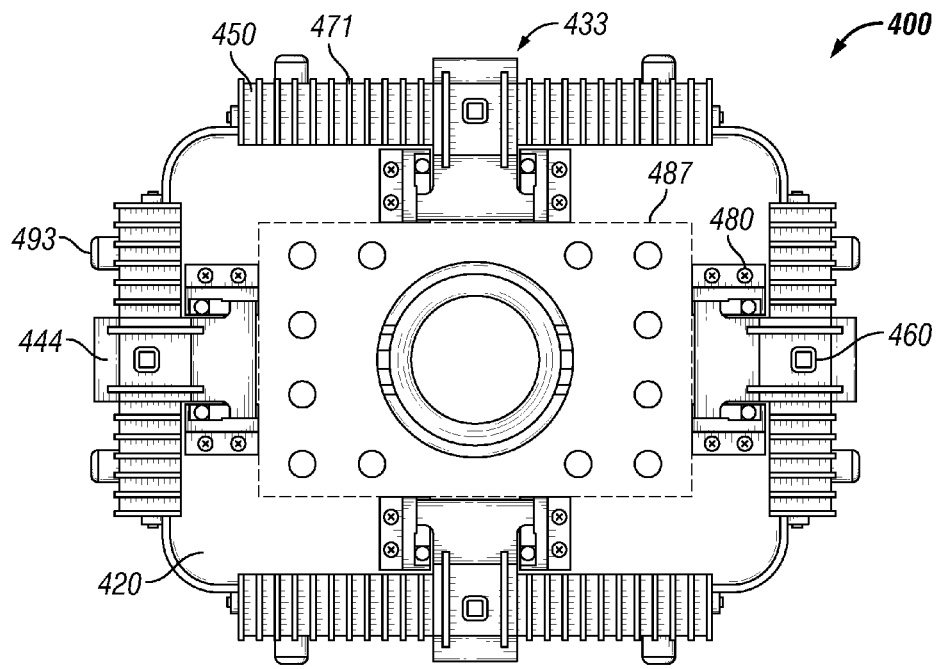

FIG. 4G shows a top view of the system 403 having an area 487 within which existing components (e.g., switches, indicating lights, pushbuttons) on the outer surface of the cover 420 can be located. Components located outside the area 487 may interfere with the operation of the fastening devices 433. The size of the area 487 can vary. For example, the distance between an edge of the cover 420 and the closest portion of the area 487 may be two inches or less.

Figure 4H:
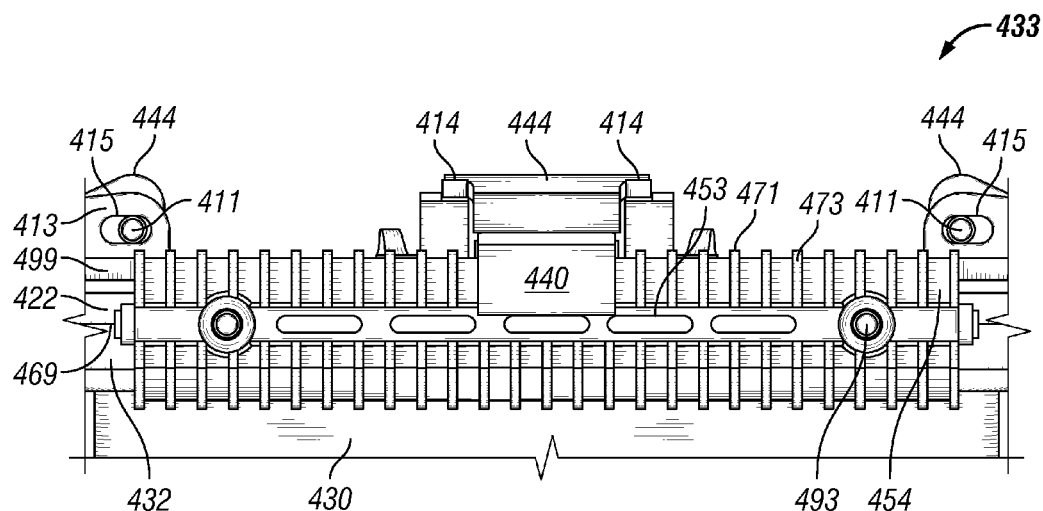

FIG. 4H shows a side view of the fastening device 433. In this example, disposed along the back side 454 of the bracket 448 are a number of through slots 443. In certain example embodiments, the through slots 443 are used to receive one or more shims for gauging the joint between the cover flange 422 and the body flange 432 of the explosion-proof enclosure 403. Further, the profile of the fastening device 433 should be relatively small. For example, the distance between the top of the back side 454 of the bracket 448 and the top of the cam 442 of the lever 444 can be as small as possible (e.g., no more than two inches). As another example, the distance between the bottom of the back side 454 and the end of the bottom side 452 can be minimized (e.g., no more than one inch).

FIG. 4I shows a perspective view of the example bracket 448. Specifically, the inner portion of the bracket 448 is shown. In certain example embodiments, one or more optional ribs 424 are disposed vertically along the inner surface of the back side 454. The ends of each rib 424 may also be disposed on the bottom surface of the top side 450 and/or on the top surface of the bottom side 452 of the bracket 448. The ribs 424 can be of any dimensions (e.g., length, width, height, thickness) and/or shape. The dimensions of a rib 424 can be substantially similar to some or all other ribs 424 disposed on the underside of the bracket 448. A rib 424 can have a straight outer edge. Alternatively, a rib 424 can have an outer edge that is non-linear. For example, the outer edge of a rib 424 can have a shape substantially similar to the side profile of the bracket 448, as shown by the outer rib 426 shown in FIG. 4I.

In addition to enhancement of the structural integrity of the bracket 448 for maintaining a flame path 169 between the cover flange 422 and the body flange 432, the ribs 424 can be used for one or more other purposes. For example, the ribs 424 can be used to properly position and maintain contact with a particular portion of the cover flange 422 and/or the body flange 432. In such a case, relief grooves can be cut into one or more surfaces that contact the ribs 424. Each example relief groove can have dimensions (e.g., depth, width, length) that are slightly larger than the corresponding dimensions of the rib 424 that mechanically couples with the relief groove. A relief groove can be cut into an outer edge of the cover flange 422, an outer edge of the body flange 432, a top surface of the cover flange 422, and/or a bottom surface of the body flange 432.

In certain example embodiments, the top side 450 of the bracket 448 is longer than the bottom side 452. In such a case, there is more overlap of the cover flange 422 by the top side 450 relative to the amount of overlap of the base flange 432 by the bottom side 452, which resists deflection of the cover 420 by the top side 450. The length of the top side 450 can depend on one or more of a number of factors, including but not limited to the desired size of the area 487, the size of the cover 420, the thickness of the top side 450, the number of protrusions 471 disposed on the top side 450, and the dimensions of the protrusions 471.

In addition, some or all of the bracket 448 can be made thicker to improve the structural integrity of the bracket 448. The added thickness of the bracket 448 can extend to all of select portions (i.e., the top side 450, the bottom side 452, and the back side 454) of the bracket 448. In addition, the added thickness of the bracket 448 can be made to all or select portions of the top side 450, the bottom side 452, and/or the back side 454. The thickness of the bracket 448 can be measured with or without consideration of the ribs 424 on the under side of the bracket 448 and/or the protrusions on the outer side of the bracket 448. As an example, the bracket 448 (without consideration of the ribs 424 and the protrusions) can be made two times thicker throughout the entire bracket 448 compared to the bracket 348 shown in FIG. 3A.

FIGS. 5A and 5B show another example fastening device 500 in accordance with certain example embodiments. Specifically, the fastening device 500 of FIGS. 5A and 5B is substantially the same as the fastening device 433 of FIGS. 4A-4I described above, except as described below. In one or more embodiments, one or more of the components shown in FIGS. 5A and 5B may be omitted, added, repeated, and/or substituted. Accordingly, embodiments of a fastening device should not be considered limited to the specific arrangements of components shown in FIGS. 5A and 5B.

Referring to FIGS. 1-5B, the fastening device 500 of FIGS. 5A and 5B shows that the fastener 514 used to adjust the compressive force applied by the bracket 548 is oriented horizontally rather than vertically, as with the fastener 414 of FIGS. 4A-4I. When the fastener 514 is oriented horizontally, the fastener 514 is substantially in line with the link 511. As with the vertical orientation of the fastener 414 shown above with respect to FIG. 4D, the fastener 514 can be driven into and/or extracted from the lever base 599. In this case, as the fastener 514 is driven into and extracted away from the cam 542 and the link 511, a horizontal force is applied to and taken away from, respectively, the cam 542 and the link 511 by the optional wear plate 510. By having the fastener 514 and optional wear plate 510 oriented substantially as shown, less force (e.g., ⅔ less force) may be used to drive the fastener 514 into and/or extract the fastener 514 from the lever base 599 compared to what is described with respect to the corresponding components of FIGS. 4A-4I above. As a result, less effort is required to adjust the compressive force applied by the bracket 548.

FIG. 5B shows an alignment pin 582 that aligns the cover flange 522 and the body flange 532. The alignment pin 582 can be of any shape and/or dimensions (e.g., height, thickness, width). The top part of the alignment pin 582 can be positioned within an aperture 583 of the cover flange 522. The bottom part of the alignment pin 582 is positioned within an aperture (hidden from view by the bottom part of the alignment pin 582, but generally shown as 584) of the body flange 532. The aperture 583 and aperture 584 have dimensions (e.g., length, width, height, curvature) that are slightly larger than corresponding dimensions of the portions of the alignment pin 582 that are positioned inside of such apertures. More than one alignment pin 582 (as well as corresponding apertures in the cover flange 522 and body flange 532) can be used for an explosion-proof enclosure 500.

The alignment pin 582 can be removably and/or fixedly coupled to one of the apertures. In this example, the bottom part of the alignment pin 582 is fixedly coupled to the aperture 584 in the body flange 532. When fixedly coupled, one or more of a number of fastening methods can be used, including but not limited to welding, epoxy, and mating threads. In certain example embodiments, the alignment pin 582 is not a separate piece, but rather an integrated portion of the cover flange 522 and/or the body flange 532. In such a case, the alignment pin 582 can be considered a protrusion of the cover flange 522 and/or the body flange 532. In addition to providing proper alignment between the cover 520 and the body 530, the alignment pin 582 can limit an amount of deflection of the cover 520 along a plane formed perpendicular to the one or more alignment pins 582.

Example embodiments of fastening devices for explosion-proof enclosures resist explosion and/or hydrostatic threes by maintaining a flame path were the cover flange and the body flange are coupled. Further, using the fastening devices described herein and other embodiments of these fastening devices allows for efficient and effective coupling and/or decoupling of the cover and the body of the explosion-proof enclosure. In addition, using example embodiments of fastening devices allows for increased flexibility with regard to where components are positioned on the cover and/or where conduit can be manually coupled to the explosion-proof enclosure. Further, using example embodiments of fastening devices for explosion-proof enclosures allows the flame path to exist within the requirements of one or more standards for explosion-proof enclosures.

In addition, example embodiments of fastening devices that include to bracket allow a user to create a hinged side between the cover and the body. In such a case, the bracket protects the hinge from being damaged while the bracket fastens the cover to the base. The connection of the bracket to the cover and/or the base can be adjusted by the user to allow for more flexible and convenient configurations between the cover, the base, and the brackets.

Accordingly, many modifications and other embodiments set forth herein will come to mind to one skilled in the art to which fastening, devices for explosion-proof enclosures pertain having the benefit of the teachings presented in the foregoing descriptions and the associated drawings. Therefore, it is to be understood that fastening devices for explosion-proof enclosures is not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for fastening a cover to a body of an explosion-proof enclosure using a plurality of fastening devices, wherein each fastening device of the plurality of fastening devices comprises:
   a first load distributing member disposed on a first flange of the explosion-proof enclosure;
   a second load distributing member disposed on a second flange of the explosion-proof enclosure, wherein the first flange abuts the second flange when the cover of the explosion-proof enclosure is coupled to the body of the explosion-proof enclosure;
   a securing member comprising a top end disposed on the first load distributing member and a bottom end disposed on the second load distributing member, and
   a cam rotatably coupled to the top end of the securing member and positioned atop the first load distributing member, wherein the cam has a closed position and an open position,
   wherein the cam, when in the closed position, pushes the top end of the securing member with a first force against a top surface of the first load distributing member and pulls the bottom end of the securing member with a second force against a bottom surface of the second load distributing member,
   wherein the first load distributing member distributes the first force along its length to result in a first distributed force, wherein the second load distributing member distributes the second force along its length to result in a second distributed force, and
   wherein the first distributed force is applied by the first load distributing member to the first flange, wherein the second distributed force is applied by the second load distributing member to the second flange, and wherein the first distributed force and the second distributed force are used to fasten the cover to the body of the explosion-proof enclosure and to provide a flame path between the first flange and the second flange of the explosion-proof enclosure.

2. The system of claim 1, wherein the securing member is disposed within a first slot in the second flange and a second slot in the first flange.

3. The system of claim 1, wherein the cam has a closed position and an open position, wherein the closed position secures the body and the cover.

4. The system of claim 1, wherein the securing member and the cam can be removed when the cam is in the open position.

5. The system of claim 1, wherein the cam comprises a feature that is positioned on a side of the cam opposite of where the cam is hingedly coupled to the securing member, wherein the feature is used to rotate the cam.

6. The system of claim 5, further comprising:
   a tool that mechanically couples to the feature, wherein the tool, when coupled to the feature, moves the cam between the closed position and the open position.

7. The system of claim 5, wherein the feature is accessible proximate to the second load distributing member when the cam is in a closed position.

8. The system of claim 5, wherein the feature is accessible proximate to the first load distributing member when the cam is in an open position.

9. The system of claim 5, wherein the securing member comprises a retaining member disposed on an outer surface of the securing member, wherein the retaining member secures the feature of the cam when the cam is in a closed position.

10. The system of claim 9, wherein the feature comprises a retaining receiver with which the retaining member mechanically couples when the cam is in the closed position.

11. A system for fastening a cover to a body of an explosion-proof enclosure using a plurality of fastening assemblies, wherein each fastening device assembly of the plurality of fastening assemblies comprises:
    a bracket comprising a top side, a bottom side, and a back side, wherein the top side is movably coupled to a first outside portion of a first flange of the explosion-proof enclosure, wherein the bottom side is movably coupled to a second outside portion of a second flange of the explosion-proof enclosure, wherein the first flange abuts the second flange when the cover is coupled to the body, and wherein the back side has a first aperture;
    a cam fixture disposed on an outer portion of the back side, wherein the cam fixture comprises a second aperture, a clearance slot, and a cam feature, wherein the second aperture aligns with the first aperture; and
    a fastening device comprising a proximal end, wherein the proximal end comprises a mating feature that fits within the clearance slot of the cam fixture and is movably disposed within the cam feature between a first position and a second position,
    wherein when the fastening device is in the first position, the proximal end of the fastening device is disposed in the clearance slot and the cover and the body of the explosion-proof enclosure are not fastened to each other, and
    wherein when the fastening device is in the second position, the proximal end of the fastening device is disposed at an end of the cam feature, and the cover and the body of the explosion-proof enclosure are fastened to each other and to provide a flame path between the first flange and the second flange of the explosion-proof enclosure.

12. The system of claim 11, wherein the fastening device further comprises a distal end, wherein the distal end comprises quick release threads, and wherein the quick release threads mate with threads disposed in the first flange of the explosion-proof enclosure.

13. The system of claim 11, wherein the bottom side is angled relative to the back side at an angle that is substantially parallel to the second outside portion of the second flange.

14. A system for fastening a cover to a body of an explosion-proof enclosure using a plurality of fastening devices, wherein each fastening device of the plurality of fastening devices comprises:

a first load distributing member disposed on a first flange;

a second load distributing member disposed on second flange, wherein the first flange abuts the second flange when the cover of the explosion-proof enclosure is coupled to the body of the explosion-proof enclosure;

a securing device comprising a bottom end hingedly coupled to the second load distributing member and a top end removably coupled to the first load distributing member; and a cam rotatably coupled to the securing device and comprising varying radii, wherein the cam has a closed position and an open position, wherein the cam, when in the closed position, pushes the top end of the securing device with a first force against a top surface of the first load distributing member and pulls the bottom end of the securing device with a second force against a bottom surface of the second load distributing member, wherein the first load distributing member distributes the first force along its length to result in a first distributed force, wherein the second load distributing member distributes the second force along its length to result in a second distributed force, and wherein the first distributed force is applied by the first load distributing member to the first flange, wherein the second distributed force is applied by the second load distributing member to the second flange, and wherein the first distributed force and the second distributed force are used to fasten the cover to the body of the explosion-proof enclosure and to provide a flame path between the first flange and the second flange of the explosion-proof enclosure.

15. The system of claim 14, further comprising a wear plate removably coupled between the cam and the first load distributing member.

16. The system of claim 15, further comprising a fastener movably coupled to the wear plate.

17. The system of claim 14, further comprising a tool that removably couples to a protrusion of the cam.

18. The system of claim 14, further comprising a locking feature that traverses the securing device and mechanically couples to the securing device.

* * * * *